(12) United States Patent
Perre et al.

(10) Patent No.: US 7,531,228 B2
(45) Date of Patent: May 12, 2009

(54) DUAL SCORED EASY OPEN FILM

(75) Inventors: Chad M. Perre, Neenah, WI (US);
Anne L. Ehrenberger, Appleton, WI (US)

(73) Assignee: Alcan Packaging Flexible France, Paris (FR)

( * ) Notice: Subject to any disclaimer, the term of this patent is extended or adjusted under 35 U.S.C. 154(b) by 187 days.

(21) Appl. No.: 11/286,958

(22) Filed: Nov. 23, 2005

(65) Prior Publication Data

US 2007/0116915 A1  May 24, 2007

(51) Int. Cl.
*B32B 3/02* (2006.01)
(52) U.S. Cl. ........................................................ 428/43
(58) Field of Classification Search .................. 428/43; 383/208, 207
See application file for complete search history.

(56) References Cited

U.S. PATENT DOCUMENTS

| | | |
|---|---|---|
| 3,790,744 A | 2/1974 | Bowen |
| 4,217,327 A | 8/1980 | Cancio et al. |
| 4,356,375 A | 10/1982 | Josephy et al. |
| 5,158,499 A | 10/1992 | Guckenberger |
| 5,229,180 A | 7/1993 | Littmann |
| 5,688,463 A | 11/1997 | Robichaud et al. |
| 6,500,514 B1 | 12/2002 | Blemberg et al. |
| 2002/0068668 A1 | 6/2002 | Chow et al. |
| 2003/0231811 A1* | 12/2003 | Hodson et al. ............... 383/208 |
| 2004/0226990 A1* | 11/2004 | Williams et al. .......... 229/123.1 |

FOREIGN PATENT DOCUMENTS

| | | |
|---|---|---|
| JP | 02219651 A | 3/1990 |
| JP | 08258867 A | 8/1996 |
| JP | 09066937 A | 11/1997 |
| WO | WO 03/103950 | 12/2003 |

* cited by examiner

*Primary Examiner*—Alexander Thomas
(74) *Attorney, Agent, or Firm*—RatnerPrestia

(57) ABSTRACT

A film having a line of weakness and a method for making a film having a line of weakness are provided. The film has a barrier layer of extruded ethylene vinyl alcohol laminated on one side to a first layer of oriented polypropylene having a score line therein. The barrier layer is laminated on its second side to a second layer of polyethylene teraphthalate having a score line therein. The score line in the oriented polypropylene layer and the score line in the polyethylene teraphthalate layer lie in a plane substantially perpendicular to a plane of the film forming the line of weakness.

1 Claim, 5 Drawing Sheets

DUAL SCORED EASY OPEN FILM

BACKGROUND OF THE INVENTION

The present invention relates to a tearable plastic film and more particularly to a dual scored film and method for making the same.

Packagings made from plastic sheets or films may not be torn directly along a straight or other regular line. Rather, when tearing forces are applied in opposite directions, the materials or films of the packagings deform and stretch until the elastic limit is surpassed, whereupon a tear or separation starts. This tear originates anywhere in the area of the deformation, usually at the weakest point produced by the reduction in thickness, and the tear will not necessarily run normal to the tearing forces which are applied. Simply, it is virtually impossible to tear a plastic film in a straight and smooth line due to its plasticity.

The tearability of a packagings made from a plastic film has been improved in a number of ways. These methods generally provide for an easy-tear arrangement in the film by the formation of score lines, either molded, mechanically or laser formed in the film, alone or in combination with other tearing means. These easy-tear arrangements eliminate the need for a separate cutting tool and enable a person to tear the film along predetermined parting lines by hand. Furthermore, such easy-tear arrangements have been proposed in a number of products including bags, envelopes, adhesive tapes, packaging sheet materials or films, sizable products for shelves, walls, windows and other coverings.

SUMMARY OF THE INVENTION

The present invention is directed to a multilayered dual scored film having a line of weakness and a process for its manufacture. According to an exemplary embodiment, the film has a first layer with a score line, a second layer with score line, and at least one layer disposed between the first and second layers. The score line of the first layer and the score line of the second layer lie in a plane substantially perpendicular to the plane of the film, thereby forming the line of weakness.

According to an exemplary method, a film of the present invention is manufactured by providing a multilayered film having a first layer, a second layer, and at least one layer disposed between the first and second layer. The first layer is scored and the second layer is scored so that the score line of the first layer and the score line of the second layer lie in a plane that is substantially perpendicular to a plane of the film to form the line of weakness.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
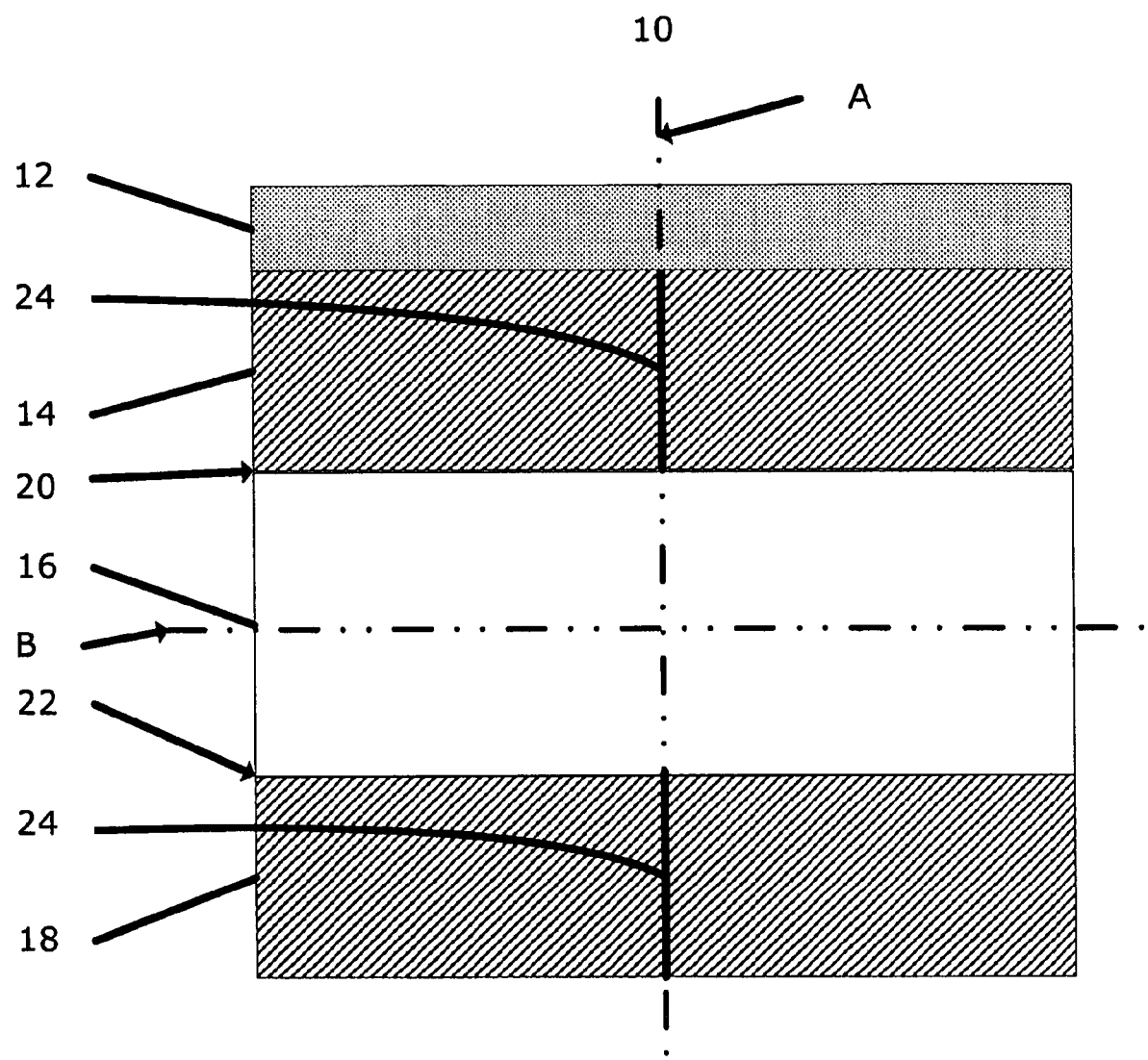
FIG. 1 is a is a cross section of a film according to an exemplary embodiment of the present invention.

FIG. 1 illustrates a cross section of a film 10 according to an exemplary embodiment of the present invention. Film 10 comprises four total layers: a sealant layer 12, a first layer 14, a barrier layer 16, and a second layer 18. Although FIG. 1 illustrates film 10 as a four-layered film, the film of the invention may comprise at a minimum, three layers, up to five, seven, or even nine or more layers depending on the application of the film.

Barrier layer 16 may also be referred to as the core layer. According to the exemplary embodiment of FIG. 1, disposed directly adjacent barrier layer 16 on a first surface thereof is first layer 14. Disposed directly adjacent barrier layer 16 on a second surface thereof is second layer 18. The term "directly adjacent" identifies two layers of a film that share an interface, i.e., two layers of the film that contact each other such that a surface forms a common boundary between the two layers. Thus, first layer 14 and barrier layer 16 share a common interface 20. Likewise, second layer 18 and barrier layer 16 share a common interface 22.

A "barrier" layer of the present invention includes any layer that prevents the passage of molecules across the layer. Exemplary molecules include gases and water substances that are impeded by the barrier layer. The gases include specific gases, such as oxygen and carbon dioxide. Gases also include those gases generally responsible for causing aroma, such as sulfur. A barrier layer of a film has the characteristic of impeding or retarding the rate at which molecules pass through the layer. For example, a barrier layer for water vapor is typically described as having a water vapor transmission rate (WVTR) that may be measured in $g/m^2/day$, a barrier layer for oxygen is typically described as having an $O_2$ permeability that may be measured in $cc/m^2/day \cdot atm$. The effectiveness of a film having barrier qualities depends on numerous variables, including, the composition of the barrier layer, the number of barrier layers, and the individual thickness of a single barrier layer or the total thickness of multiple barrier layers. Exemplary compositions of a barrier layer of the present invention include, but are not limited to, polyvinylidene chloride, nylon, ethylene vinyl acetate, ethylene vinyl alcohol and mixtures or combinations of two or more thereof.

One exemplary barrier layer of the present invention includes an encapsulated barrier as described in U.S. Pat. No. 6,500,514, the contents of which are incorporated by reference. An encapsulated barrier layer includes a barrier material made from EVOH, nylon or other thermally sensitive barrier material encapsulated by a first adhesive material. The barrier material and the first adhesive material form a barrier layer and a first set of adhesive layers when coextruded. The barrier layer and the first set of adhesive layers may be coextruded at the same or a similar temperature to form a first extrudate. The extrudate may be encapsulated by or otherwise coextruded with a second adhesive material to form a second extrudate at a higher temperature than the first extrudate that then may be formed into a flat sheet via a die. The first set of adhesive layers protects the barrier layer from high temperatures and long residence times related to the coextrusion/lamination process that may degrade the barrier layer. The result is an extrudate with excellent clarity. Other barrier layers, including mixtures of compositions thereof, as would be known to one skilled in the art to be used for their intended purpose, are also contemplated by this invention.

Figure 2:
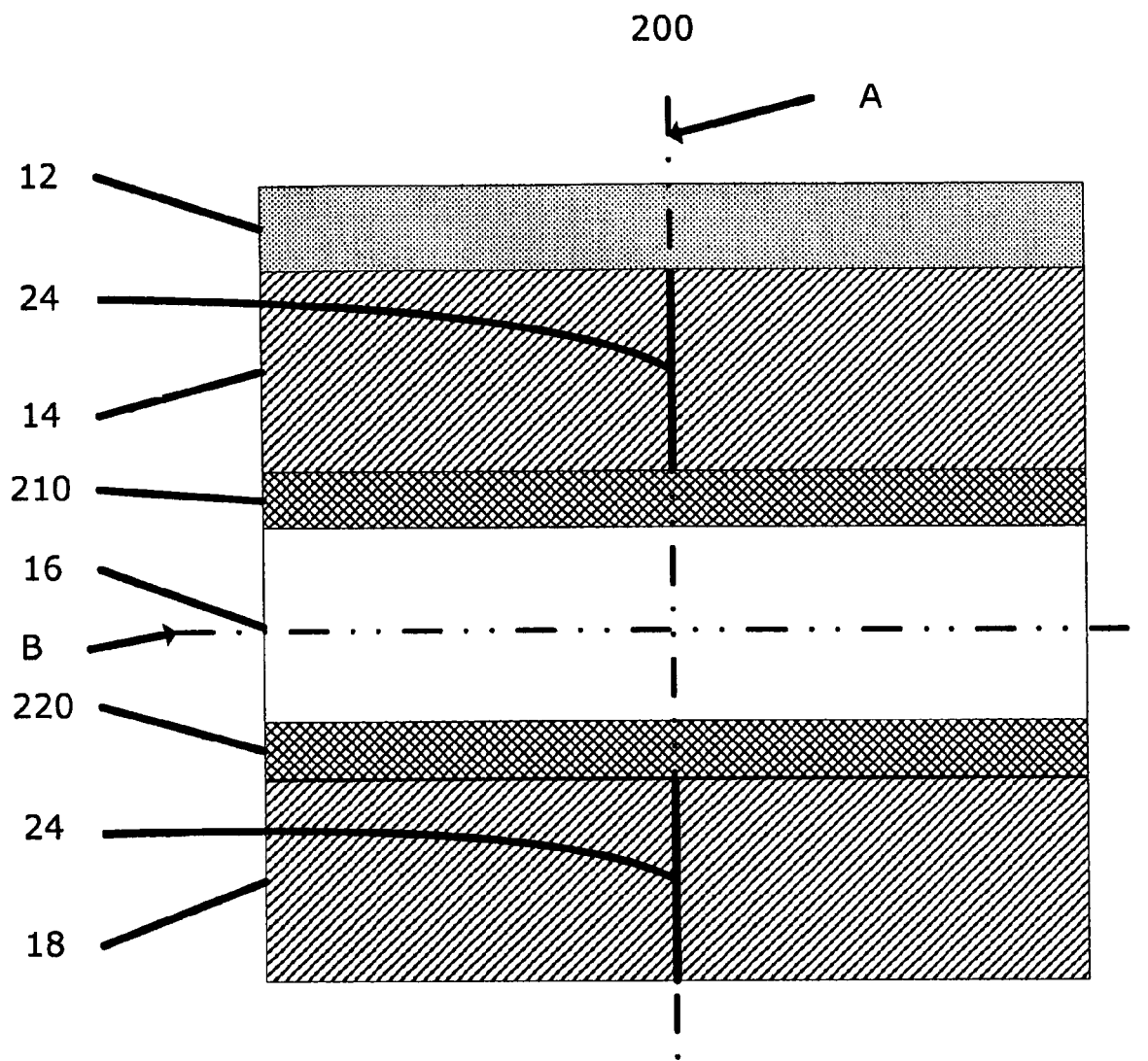
FIG. 2 is a is a cross section of a film according to another exemplary embodiment of the present invention.

Alternative embodiments for the structure of a film contemplated by this invention are shown in FIG. 2 and include those films where first layer 14 and second layer 18 are laminated to barrier layer 16. The term "laminated to" includes a situation where two layers are directly adjacent each other, and also where two layers form part of the same film and have an intermediate layer or layers disposed between them. For example, FIG. 2 illustrates an intermediate layer 210 disposed between first layer 14 and barrier layer 16. Similarly, an intermediate layer 210 is also disposed between second layer 18 and barrier layer 16. One or more intermediate layers may be disposed between the first or second layers and the barrier layer.

In one embodiment, the first layer 14 of film 10 comprises polypropylene. According to an exemplary embodiment, the polypropylene (PP) is oriented, either uniaxially or biaxially. Suitable alternative polypropylenes include, but are not limited to metalized polypropylene and PVdC coated polypropylene. Provided in first layer 14 is a score line 24. A "score line" refers to a furrow or ridge, either continuous or intermittent, produced in the layer. This furrow or ridge may include small marks or detents made into the film or layer or small marks that penetrate through the entire thickness of the film or layer. Typically, the score line is made from a mechanical process where the film or individual layer is pressed against a sharp object, such as a knife. The score line may be made from a non-mechanical process, such as exposure of the layer to a laser. The embodiments of the invention shown in FIGS. 1 and 2 illustrate a cross section of a film having first and second layers, each with one score line therein. Alternatively, more than one score line may be made in the same layer.

Second layer 16 of film 10 comprises polyethylene terephthalate (PET). According to an exemplary embodiment, the PET is a homopolymer. Alternatively, the PET is modified by copolymerization such that cyclohexane dimethanol (CHDM) replaces ethylene glycol in the backbone of the polymer, or it is modified with isophthalic acid to replace some of the para-linked terephthalate units with 1,3- or meta-linkages, which disturb the crystallinity of the polymer. This form of PET is typically referred to a APET, for "amorphous PET." Preferred PET for the present invention has an intrinsic viscosity between 0.65 and 0.85 as measured by one skilled in the art using, for example, ASTM D4603: *Test Method for Determining Inherent Viscosity of Poly* (*Ethylene Terephthalate*) (*PE*), (08.03).

Score line 24 of first layer 14 and score line 24 of second layer 18 are positioned that when the film is viewed in cross-section as shown in the exemplary embodiments of FIGS. 1 and 2, the score lines lie in plane A, which is substantially perpendicular to plane B of the film. The position of the score lines in the first and second layers are such that the film may be torn along the score line to provide an easy open tear film.

Figure 3:
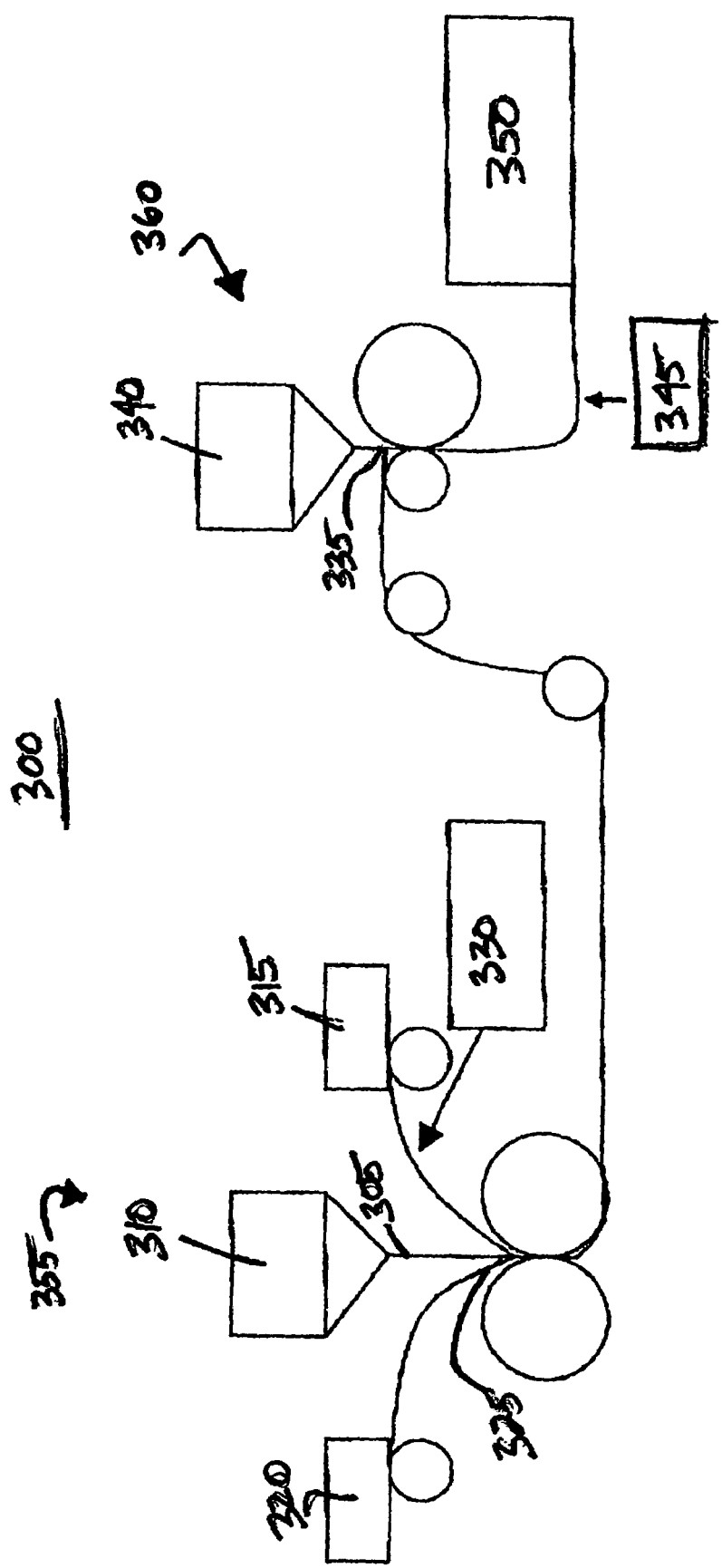
FIG. 3 is a schematic representation of an exemplary method for making a film of the present invention.

An exemplary method of manufacturing a dual scored easy open film of the present invention is best described with reference to FIG. 3. FIG. 3 illustrates a schematic tandem extrusion laminator machine 300. FIG. 3 illustrates the first mechanically scoring/lamination process 355 and a second laser scoring/lamination process 360. FIG. 3 illustrates processes 355 and 360 as a continuous or in line process, although this process could be performed in separate and distinct steps. Barrier layer 305 is extruded from extruder 310. First layer 315 and second layer 320 are laminated to barrier layer 305 at nip point 325. Before first layer 315 reaches nip point 325 it is scored by scoring device 330. Scoring device 330 is a mechanical or non-mechanical device that imparts a score line to first layer 315. Various scoring devices are known to those skilled in the art. The combined film then passes to a second lamination point 335 where sealant layer 340 is laminated to first layer 315. The film then passes by a second scoring device 345 where a score line is imparted into second layer 320 without effecting barrier layer 310 or first layer 315. Second scoring device is preferably a fixed position laser. The second scoring device 345 imparts the score line in the second layer 320 such that the first score line in first layer 315 and the second score line in second layer 320 are generally in line with each other. Specifically, each score line generally lies in the same plane, which plane is defined by the two scores, and which is substantially perpendicular to the plane of the film. This forms a straight line tear-opening feature while maintaining the barrier properties of the film.

Figure 4:
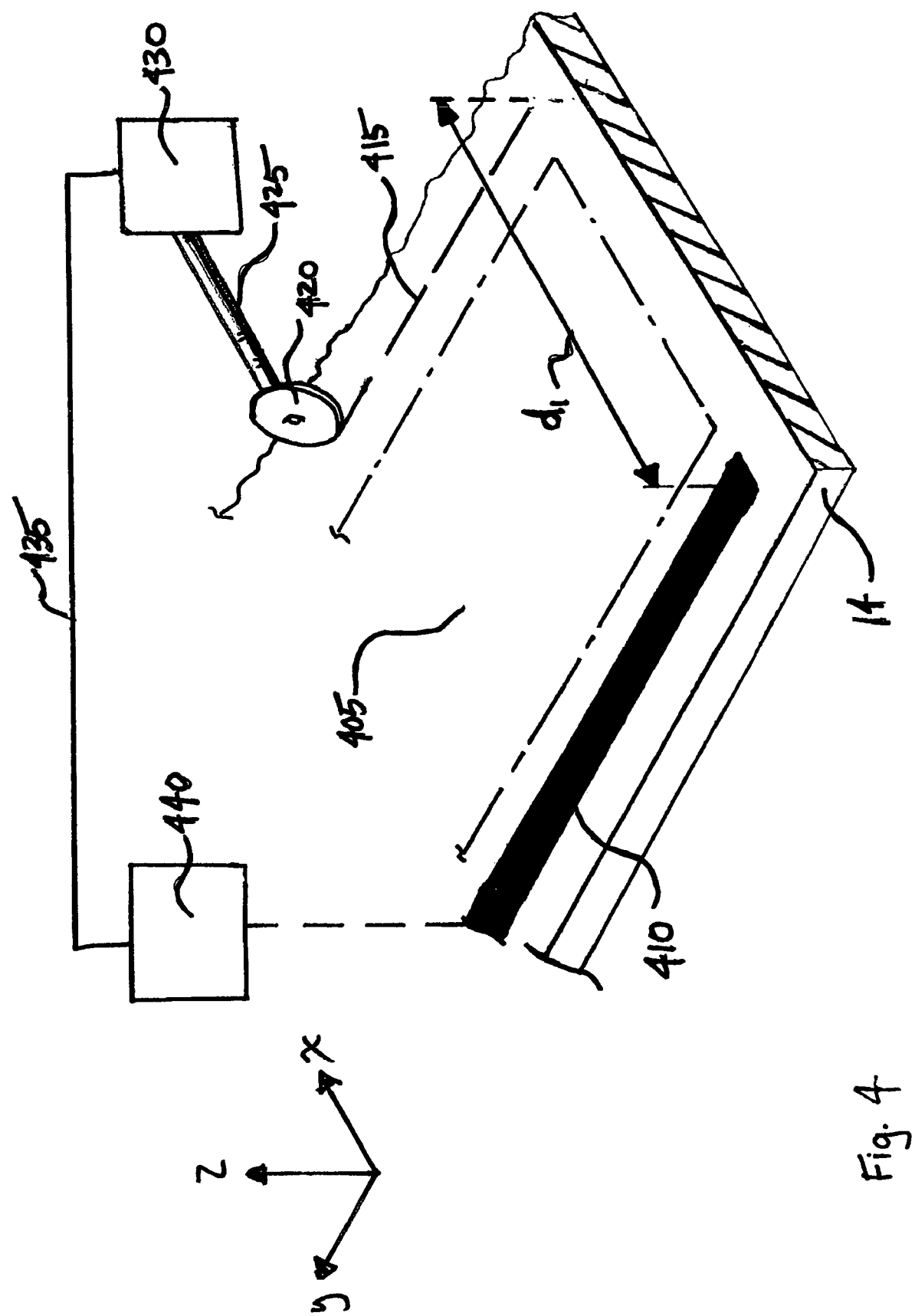
FIG. 4 is a schematic illustration of a first scoring method according to an exemplary embodiment of the present invention.

An exemplary method of manufacturing a dual score easy open film of the present invention begins with printed material on first layer 14. FIG. 4 illustrates an exemplary perspective view of first layer 14. Printed material 405, for example, nutrition information for food stuffs, is printed on first layer 14 either in a continuous process with the manufacture of the dual score film or prior to its manufacture. FIG. 4 shows one printed material having a width. A printed line 410 is also printed on first layer 14. Printed line 410 is a continuous or intermittent printed line serving as a guide line. It is about 3.0 to 3.2 mm in width, preferably 3.175 mm. Before first layer 14 and second layer 18 are fed to the tandem extrusion laminator process, first layer 14 is scored.

According to the exemplary embodiment illustrated in FIG. 4, a score line 415 is imparted into first layer 14 by a mechanical score device 420 mounted to a shaft 425 connected to an actuator 430 that moves perpendicular to the direction of travel Y of layer 14, e.g., in the cross-machine direction X. Actuator 430 is in electrical communication 435 with a photo eye 440. Photo eye 440 reads printed line 410, also called an "eyeline." Photo eye 440 is in communication with actuator 430 and maintains score line 415 at a predetermined distance $d_1$ from printed line 410 even if first layer 14 moves in the cross-machine direction as it is fed to the tandem laminator/extruder.

The film (also called a web) and its layers may be made such that it has a width that is a multiple of the printed material width. For example, if the printed material is 33 cm in width, the web may be made to at least 100 cm in width such that three printed materials span the width of the web. In the same manner, multiple printed lines and multiple scoring lines may be used to accommodate the number of printed materials on a single width the web.

Figure 5:
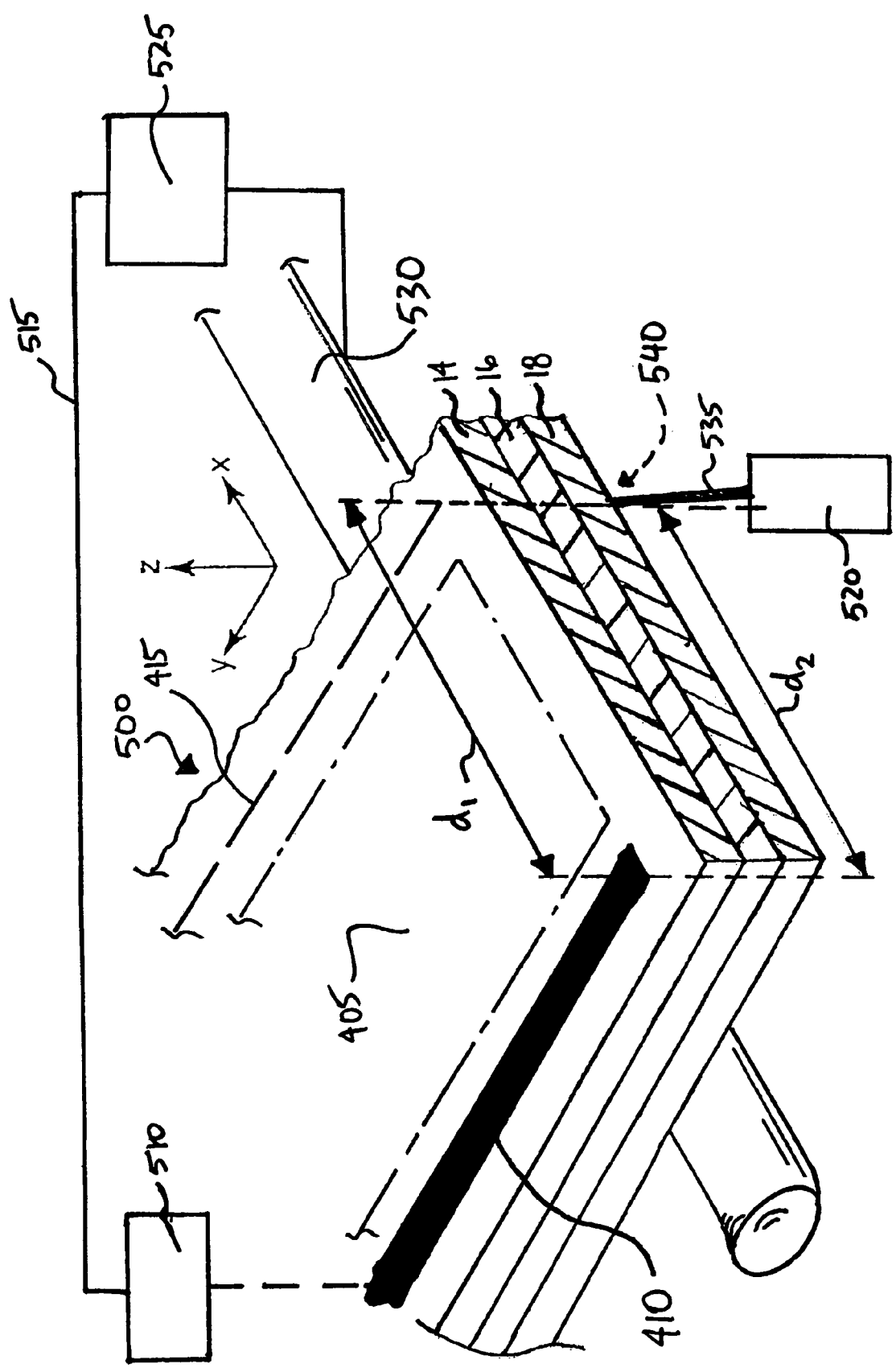
FIG. 5 is a schematic illustration of a second scoring method according to an exemplary embodiment of the present invention.

After first layer 14 is scored, first layer 14 and second layer 18 are laminated to barrier layer 16 in a tandem extrusion laminator. FIG. 5 illustrates an exemplary film structure 500 after lamination (shown without the optional sealant layer). Film 500 is fed to a rewinder/slitter where the film is slit to its final web width requirement (not shown). During the rewinding/slitting process, a second photo eye 510 reads printed line 410 on the surface of first layer 14 as the film 500 is fed into the rewinder. If during this process film 500 is caused to move in the cross-machine direction, e.g. the X direction, an actuator 525, in electrical communication 515 with photo eye 510, moves cam shaft 530 in the cross-machine direction so that laser 535 of fixed position laser 520 imparts a second score line 540 into second layer 18 at a predetermined distance $d_2$ from printed line 410. Predetermined distance $d_2$ is set approximately equal to predetermined distance $d_1$. In this way, mechanically imparted score line 415 in first layer 14 lies in generally the same Z direction plane as the laser imparted score line 540 in second layer 18. In other words, score line 540 and the score line 415 appear in a straight line when the film is viewed in cross section. When optional sealant layer is applied to film 500, the result is the exemplary film as shown in FIG. 1.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A dual scored film having a line of weakness consisting of:

a barrier layer comprising extruded ethylene vinyl alcohol;

a first layer comprising oriented polypropylene having a mechanically scored score line therein and laminated to one side of the barrier layer;

a second layer comprising polyethylene teraphthalate having a laser scored score line therein and laminated to a second side of the barrier layer; and a third layer comprising ethylene vinyl acetate disposed directly adjacent the second layer and on an opposing side of the second layer from the barrier layer, wherein the score line in the oriented polypropylene layer and the score line in the polyethylene teraphthalate layer generally lie in a plane substantially perpendicular to a plane of the film to form the line of weakness.

* * * * *